United States Patent
Hong et al.

(10) Patent No.: US 12,210,924 B1
(45) Date of Patent: Jan. 28, 2025

(54) TIE

(71) Applicants: YOKE INDUSTRIAL CORP., Taichung (TW); Asia Smart Tag Co., Ltd., Taichung (TW); Yu-Ying Lin, Taichung (TW)

(72) Inventors: Rong-Der Hong, Taichung (TW); Lien-Feng Lin, Taichung (TW); Yu-Ying Lin, Taichung (TW)

(73) Assignees: YOKE INDUSTRIAL CORP., Taichung (TW); ASIA SMART TAG CO., LTD., Taichung (TW); Yu-Ying Lin, Taichung (TW)

( * ) Notice: Subject to any disclaimer, the term of this patent is extended or adjusted under 35 U.S.C. 154(b) by 0 days.

(21) Appl. No.: 18/378,315

(22) Filed: Oct. 10, 2023

(30) Foreign Application Priority Data

Jul. 7, 2023 (TW) .................................. 112207063

(51) Int. Cl.
*G06K 19/077* (2006.01)

(52) U.S. Cl.
CPC .............................. *G06K 19/07728* (2013.01)

(58) Field of Classification Search
CPC ................................................ G06K 19/07728
USPC ......................................................... 235/492
See application file for complete search history.

(56) References Cited

U.S. PATENT DOCUMENTS

| | | | |
|---|---|---|---|
| 2010/0078487 A1* | 4/2010 | Baba ................ | G06K 19/07718 235/492 |
| 2016/0060009 A1* | 3/2016 | Verhoeven ......... | B65D 63/1027 235/492 |
| 2021/0175602 A1* | 6/2021 | Forster ..................... | H04B 5/77 |

FOREIGN PATENT DOCUMENTS

GB  2477927 A  8/2011

* cited by examiner

*Primary Examiner* — Allyson N Trail
(74) *Attorney, Agent, or Firm* — Birch, Stewart, Kolasch & Birch, LLP

(57) ABSTRACT

A tie includes an RFID device and a body encapsulating the RFID device by overmolding. The body includes a strap member, a head member, and a protection member connected between the strap member and the head member. The strap member has a plurality of engaging teeth. The RFID device is embedded in the protection member. The head member has a through hole. A hole wall of the through hole is provided with a one-way pawl. When winding the body around an object, the protection member can get a better protection since the protection member is located on an inner side between the head member and the strap member without protruding outward. Because the protection member and the head member are closer to a surface of the object, the extent to which the protection member protrudes outwards is reduced, thereby facilitating the RFID device to be sensed more easily.

7 Claims, 8 Drawing Sheets

TIE

BACKGROUND OF THE INVENTION

Technical Field

The present invention relates generally to a device with an electronic tag, and more particularly to a tie with an RFID device.

Description of Related Art

There are ties with an electronic tag. For example, the tie disclosed in the UK Patent Publication No. GB2477927A includes a strap member and a head section, wherein a housing is provided outside the head section and an RFID (Radio Frequency Identification) device is disposed inside the housing. When the tie with the RFID tag is in use, the strap member is wound around an object to be fastened and is subsequently inserted into the head section to form a loop, such that the head section and the strap member are fastened around the object.

The above-mentioned tie with the RFID tag can fasten the housing and the RFID device inside the housing to the head section. However, as the housing is located on the outermost end of the tie, the head section tightly abuts against the object and the housing protrudes outwards subsequently while fastening the head section and the strap member to the object. As a result, the housing protrudes outwards obviously relative to the strap member. During usage, the housing is susceptible to impacts from external objects, causing damage to the RFID device inside the housing. Besides, since the RFID device is only inserted into a recess of the housing, the RFID device is inadequately encapsulated, causing the possibility of detachment and damage when subjected to impacts.

BRIEF SUMMARY OF THE INVENTION

In view of the above the primary objective of the present invention is to provide a tie, including an RFID device and a body encapsulating the RFID device by overmolding, wherein a protection member wherein the RFID is embedded is disposed between a head member and a strap member, so that the protection member is unsusceptible to impacts, thereby preventing the RFID device from damage. As an extent to which the protection member protrudes outward is reduced, the RFID device inside the protection member retains a state of being easy to read or write data by devices, such as RFID readers or mobile phones.

The present invention provides a tie, including an RFID device and a body encapsulating the RFID device by overmolding. The RFID device includes a circuit board and an antenna electrically connected to the circuit board. The body includes a strap member, a protection member, and a head member which are integrally formed as a monolithic unit and are connected in sequence. The strap member extends in a first direction and has a strap top face and a strap bottom face, wherein the strap top face has a plurality of engaging teeth arranged along the first direction. The protection member has a protection top face and a protection bottom face, wherein the RFID device is embedded in the protection member. An end of the strap member is connected to a position of the protection member adjacent to the protection bottom face. The head member is connected to a side of the protection member facing away from the strap member and has ahead top face and a head bottom face. A through hole penetrates through the head top face and the head bottom face and is configured to be passed by the strap member. A hole wall of the through hole is provided with at least one one-way pawl.

The advantage of the present invention is that, the position of the protection member is between the head member and the strap member, so that when the body is wound around the object, the protection member could be located on a side of the head member of the strap member, so that the protection member could to be protected, and the protection member, wherein the RFID device is embedded, could be prevented from direct impacts of external objects, thereby ensuring the safety of the RFID device and retaining the RFID device unsusceptible to damage. Besides, when the body is wound around the object, the junction between the protection member and the head member occupies a greater portion of the object in a circumferential direction of the object, so that the extent to which the protection member and the head member protrude outwards simultaneously could be reduced, thereby retaining the RFID device at a state of being easy to read or write data by devices such as RFID readers or mobile phones.

BRIEF DESCRIPTION OF THE SEVERAL VIEWS OF THE DRAWINGS

The present invention will be best understood by referring to the following detailed description of some illustrative embodiments in conjunction with the accompanying drawings, wherein.

DETAILED DESCRIPTION OF THE INVENTION

Figure 1:
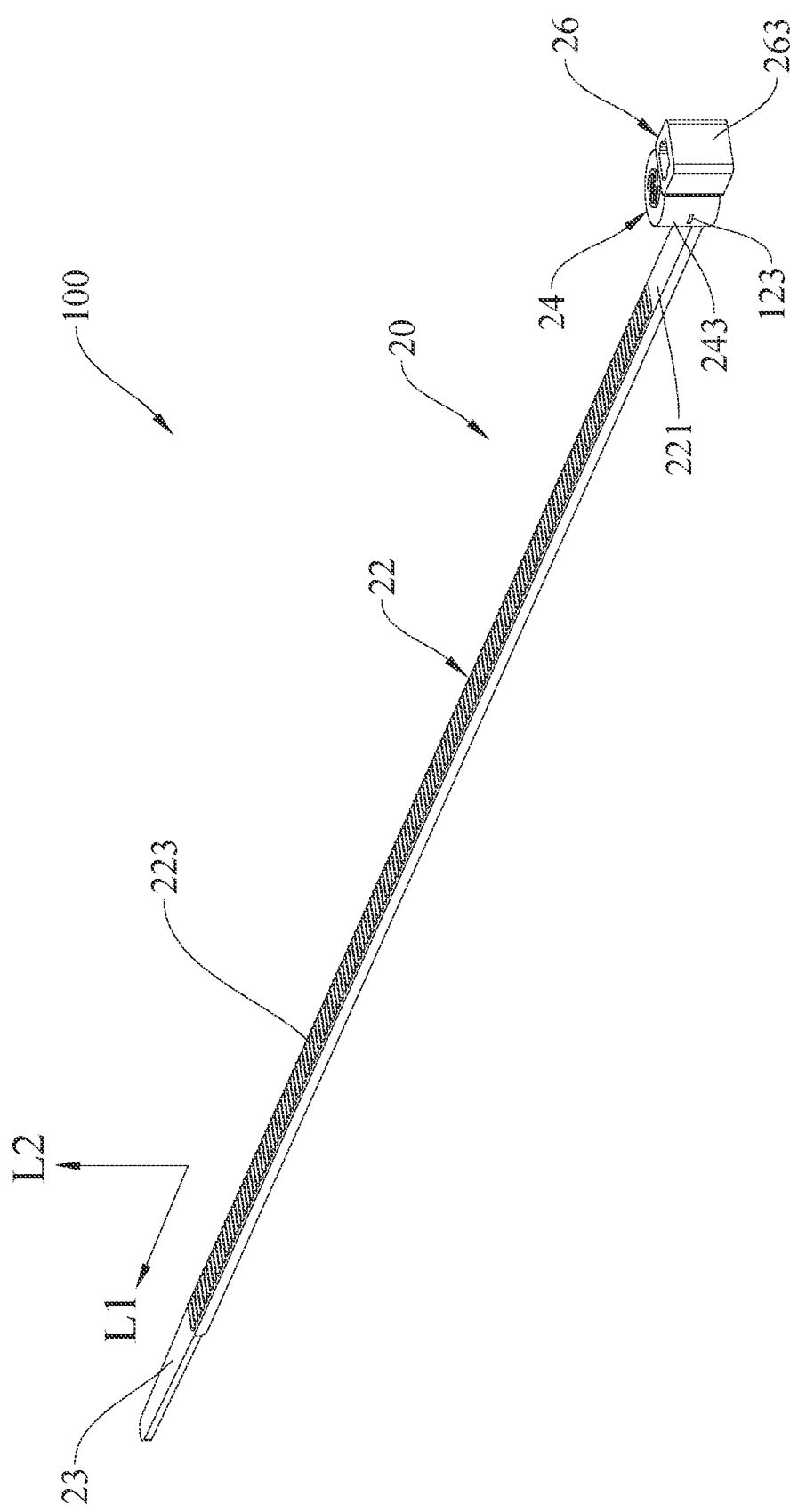
FIG. 1 is a perspective view of a tie according to an embodiment of the present invention.
Figure 2:
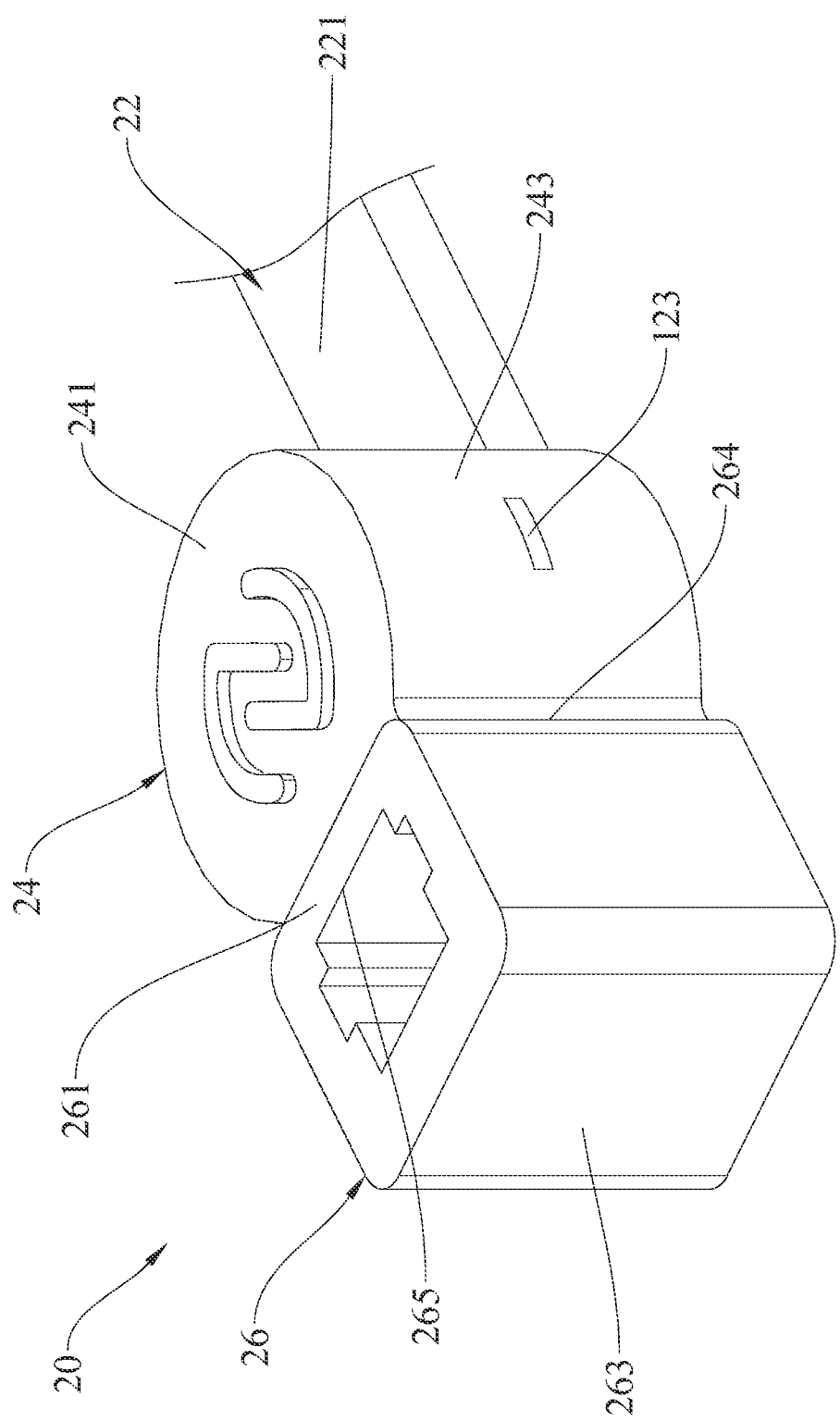
FIG. 2 is a perspective view of the tie seen from another direction according to the embodiment of the present invention.
Figure 3:
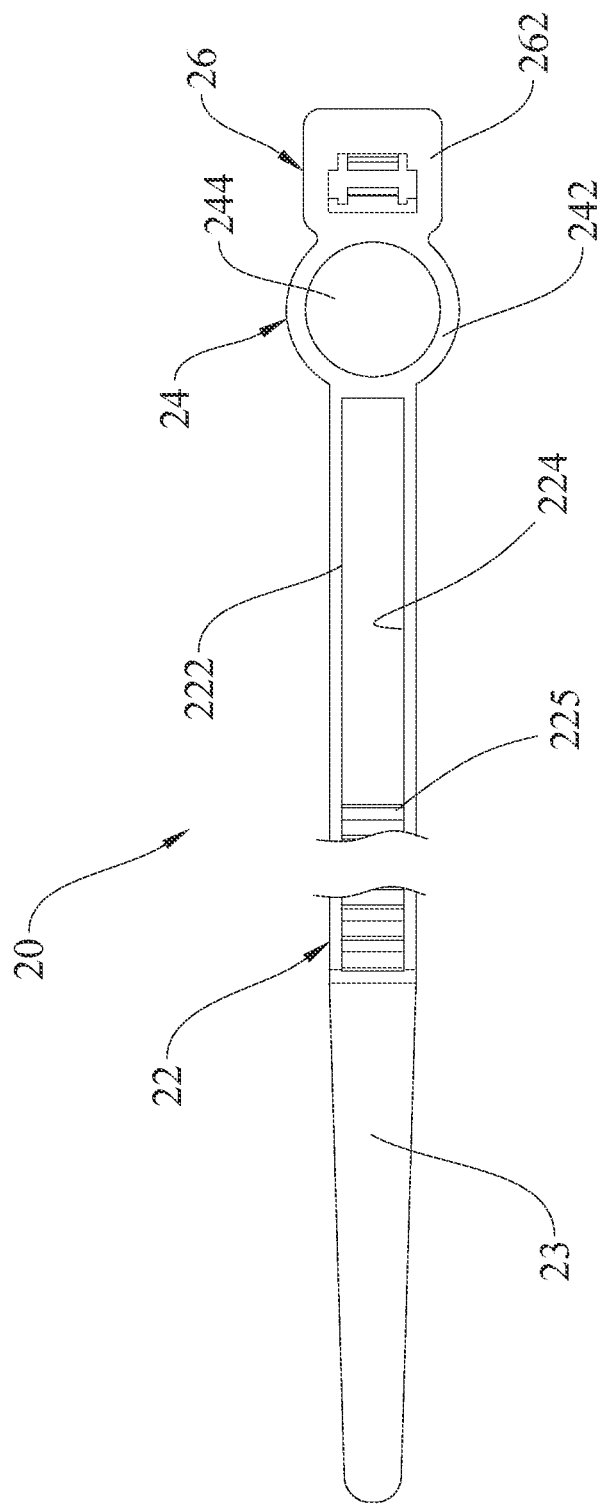
FIG. 3 is a bottom view of the tie according to the embodiment of the present invention.
Figure 4:
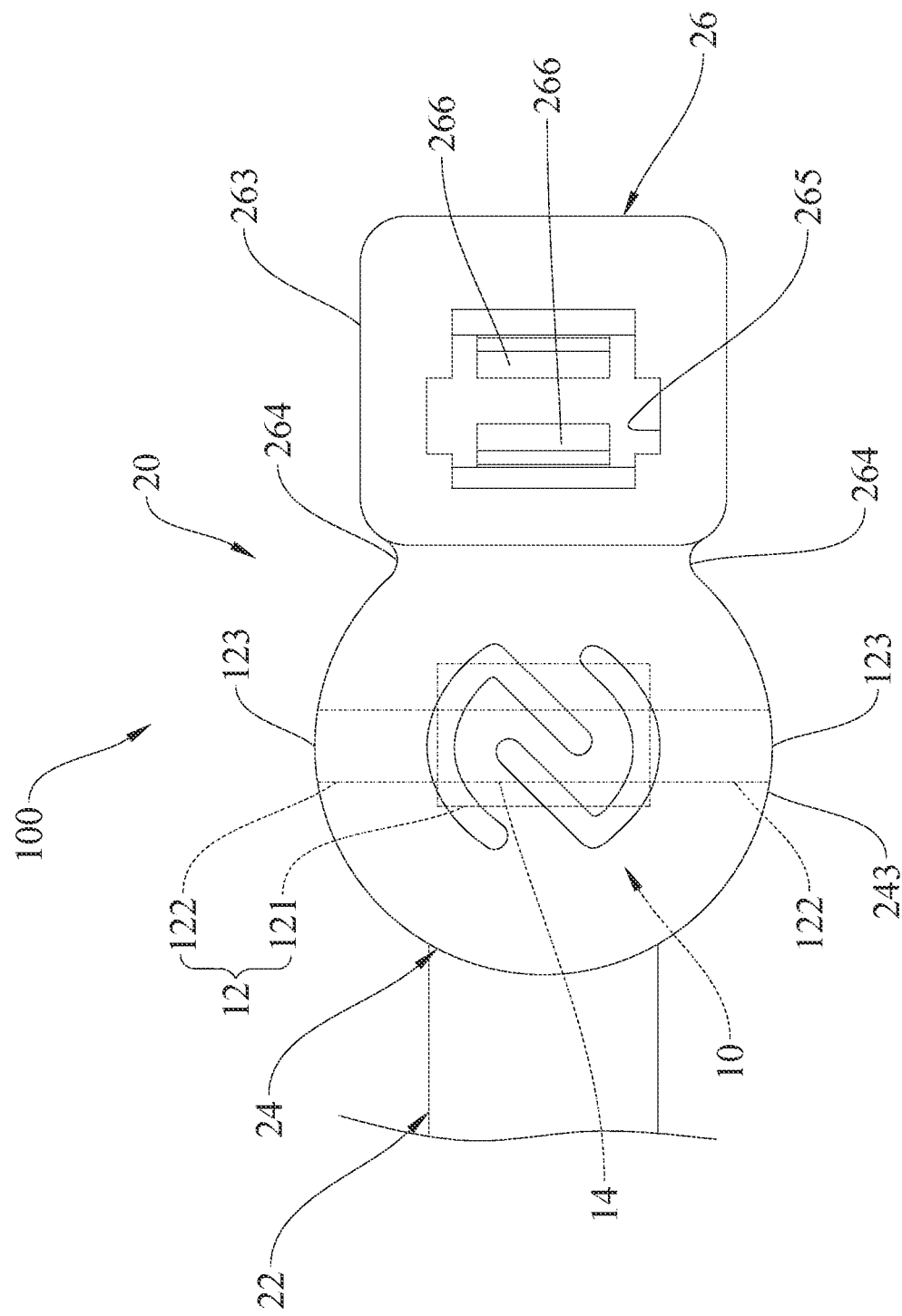
FIG. 4 is a top view of the protection member and the head member according to the embodiment of the present invention.
Figure 5:
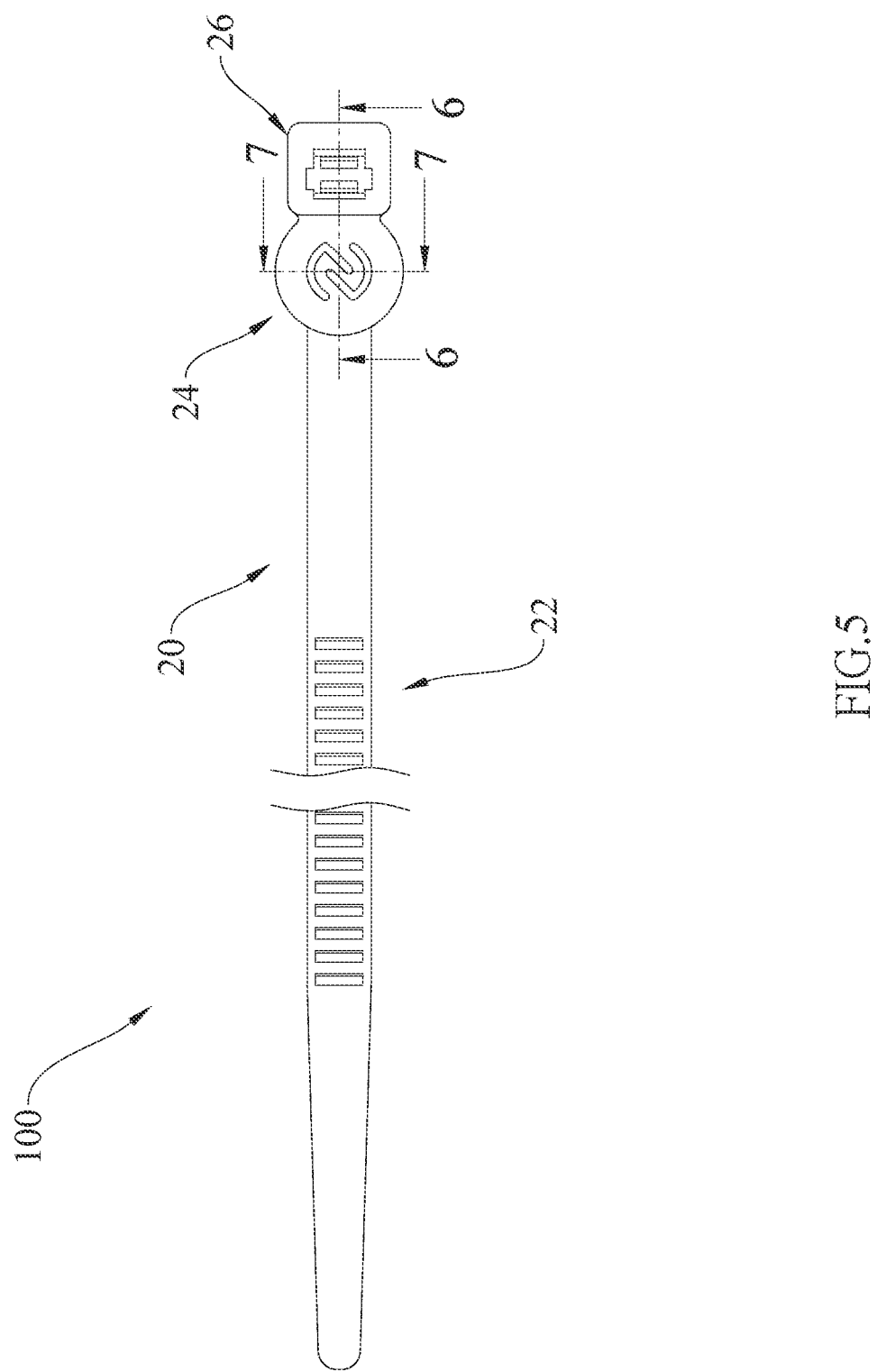
FIG. 5 is a top view of the tie according to the embodiment of the present invention.

A tie 100 according to an embodiment of the present invention is shown in FIG. 1 to FIG. 7 and includes an RFID device 10 and a body 20 encapsulating the RFID device 10 by overmolding.

As shown in FIG. 4 to FIG. 7, the RFID device 10 includes a circuit board 12 and an antenna 14 and is encapsulated in the body 20 by overmolding. The circuit board 12 includes a main board 121 with an RFID chit) and two connecting boards 122 respectively connected to two opposite sides of the main board 121, wherein the main board 121 has a main bottom face 1211. The main board 121 is a circuit board with a printed circuit. In the overmolding process of the body 20, the two connecting boards 122 are configured to support the main board 121 to secure a position of the RFID device 10, such that the RFID device 10 could be encapsulated by the injected material of the body 20 without being moved. After the body 20 is overmolded, a portion of each of the connecting boards 122 protruding outside a surface of the body 20 is cut off, so that a cutting face 123 is formed on an end of each of the connecting boards 122. The antenna 14 is electrically connected to the main board 121 of the circuit board 12. In the current embodiment, the antenna 14 is a coil structure.

As shown in FIG. 1 to FIG. 4, the body 20 includes a strap member 22, a protection member 24, and a head member 26 which are integrally formed as a monolithic unit and are connected in sequence in a first direction L1. The body 20 is overmolded and encapsulates the RFID device 10. The method of encapsulating the RFID device 10 by the body 20 may refer to the Taiwan Invention Patent No. 1784842 "RADIO FREQUENCY IDENTIFICATION ELECTRONIC DEVICE AND METHOD THEREOF, AND THE ARTICLE THAT CAN SENSE RADIO FREQUENCY ELECTRONIC SIGNALS". The strap member 22 is elongated and extends in the first direction L1. The strap member 22 has a strap top face 221 and a strap bottom face 222. Two opposite ends of the strap member 22 respectively are a proximal end close to the protection member 24 and a distal end away from the protection member 24. The strap top face 221 has a plurality of engaging teeth 223 arranged along the first direction L1. The strap bottom face 222 has a strip groove 224 extending in the first direction L1. A plurality of engaging teeth 225 is provided in the strip groove 224 and is arranged along the first direction L. The distal end of the strap member 22 is an insertion portion 23 with a width that gradually decreases in a direction away from the head member 26. A first height H1, which is a height of the strap member 22, is provided between the strap top face 221 and the strap bottom face 222 in a second direction L2 perpendicular to the first direction L1.

As shown in FIG. 4 to FIG. 7, the protection member 24 is a prism or a cylindrical structure. More specifically, the protection member 24 is a cylinder and has a protection top face 241, a protection bottom face 242, and a protection peripheral face 243 connected between the protection top face 241 and the protection bottom face 242. The protection bottom face 242 has a recess 244. The recess 244 is formed by recessing into a center of the protection bottom face 242. A center of the recess 244 is deeper and a periphery around the center of the recess 244 is gradually shallower, that is, a depth of the recess 244 gradually decreases from the center of the recess 244 to the periphery around the center of the recess 244. The proximal end of the strap member 22 is connected to a position of the protection peripheral face 243 adjacent to the protection bottom face 242. The strap bottom face 222 of the strap member 22 is aligned with the protection bottom face 242. The protection top face 241 protrudes relative to the strap top face 221 of the strap member 22 in the second direction L2. With the formation of the recess 244, a thickness of a center of the protection member 24 in the second direction L2 could be reduced; in the overmolding process of the body 20 by using plastic, the problem of surface depression and unevenness of a position of the protection member 24 facing away from the recess 244 (i.e., the protection top face 241) due to the cooling of the plastic material could also be avoided.

The RFID device 10 is encapsulated by and embedded in the protection member 24. The two cutting faces 123 of the connecting boards 122 on the two opposite sides of the RFID device 10 are respectively aligned with two opposite sides of the protection peripheral face 243 and are respectively exposed outside. Taking the protection bottom face 242 as a base face for determining heights, a height of the main bottom face 1211 in the second direction L2 is a deposing height H3, wherein the deposing height H3 is greater than the first height H1 (the height of the strap member 22) and is less than or equal to 60% of a protection height H4 (a height of the protection top face 241 in the second direction L2). The antenna 14 is disposed on a side of the main board 121 facing the protection top face 241.

The head member 26 is a prism or a cylindrical structure. More specifically, the head member 26 is a rectangular prism and has a head top face 261, a head bottom face 262, and a head peripheral face 263 connected between the head top face 261 and the head bottom face 262. A side of the head peripheral face 263 of the heat member 26 is connected to a side of the protection peripheral face 243 of the protection member 24 facing away from the strap member 22, that is, a side of the head peripheral face 263 is connected to a corresponding side of the protection peripheral face 243. Two grooves 264 are formed respectively on two opposite sides of a junction between the protection member 24 and the head member 26. The strap bottom face 262 is aligned with the protection bottom face 242 and the head bottom face 222. The protection top face 261 and the head top face 241 respectively protrude relative to the strap top face 221 in the second direction L2.

Figure 6:
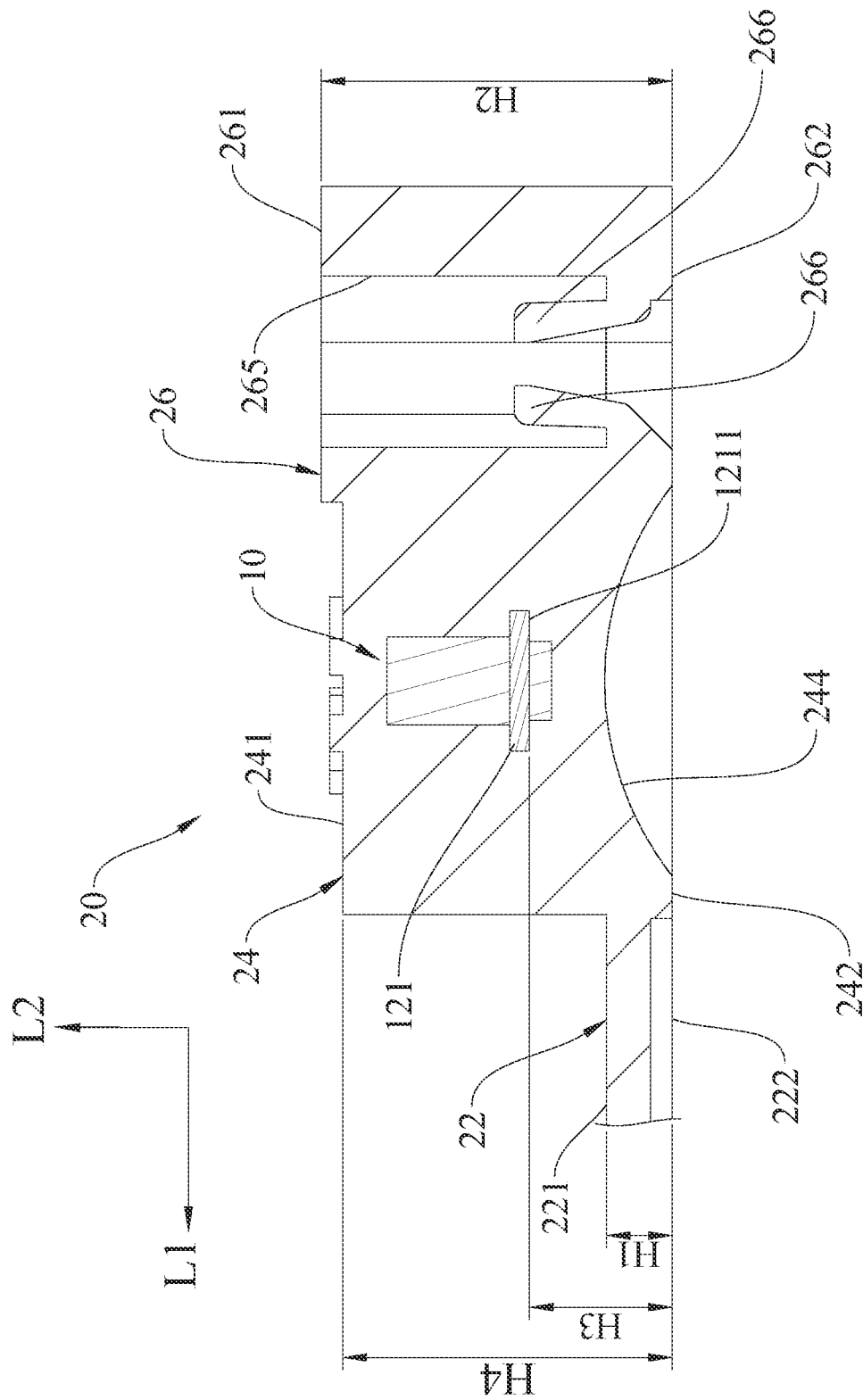
FIG. 6 is a sectional view along the 6-6 line in FIG. 5.
Figure 7:
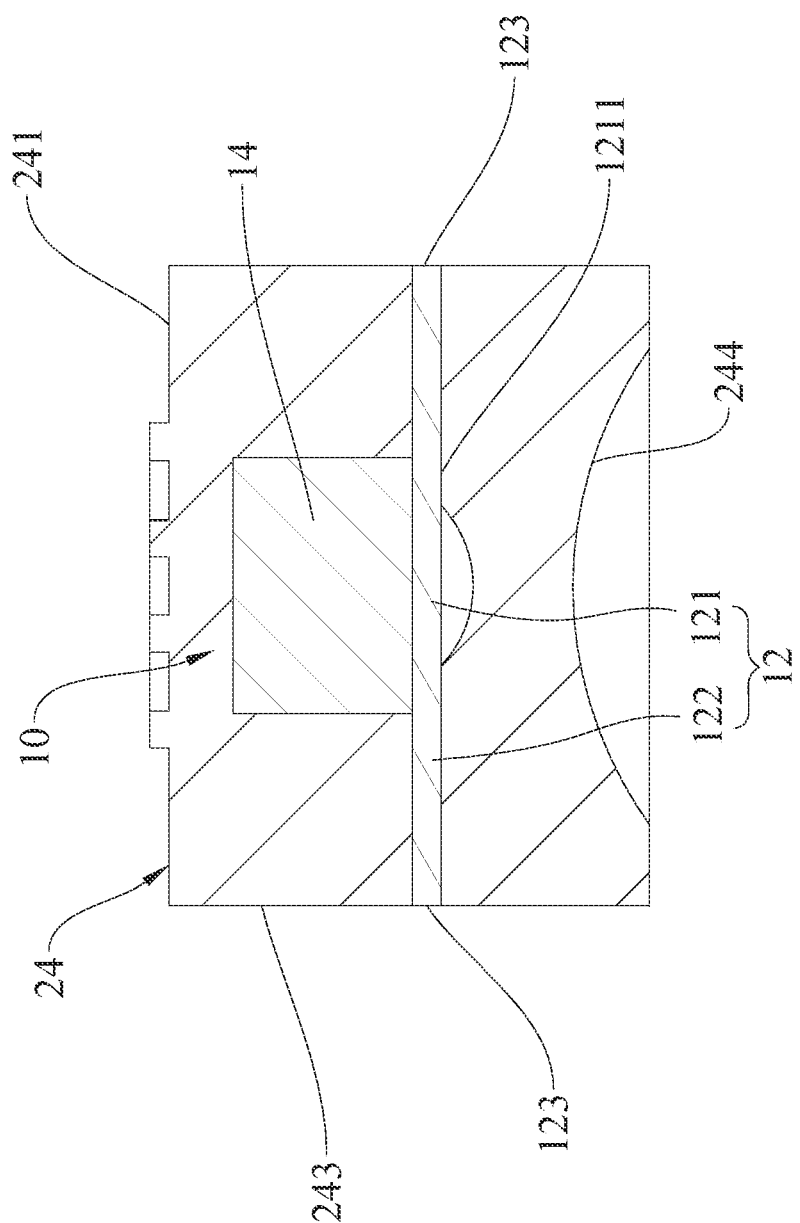
FIG. 7 is a sectional view along the 7-7 line in FIG. 5.
Figure 8:
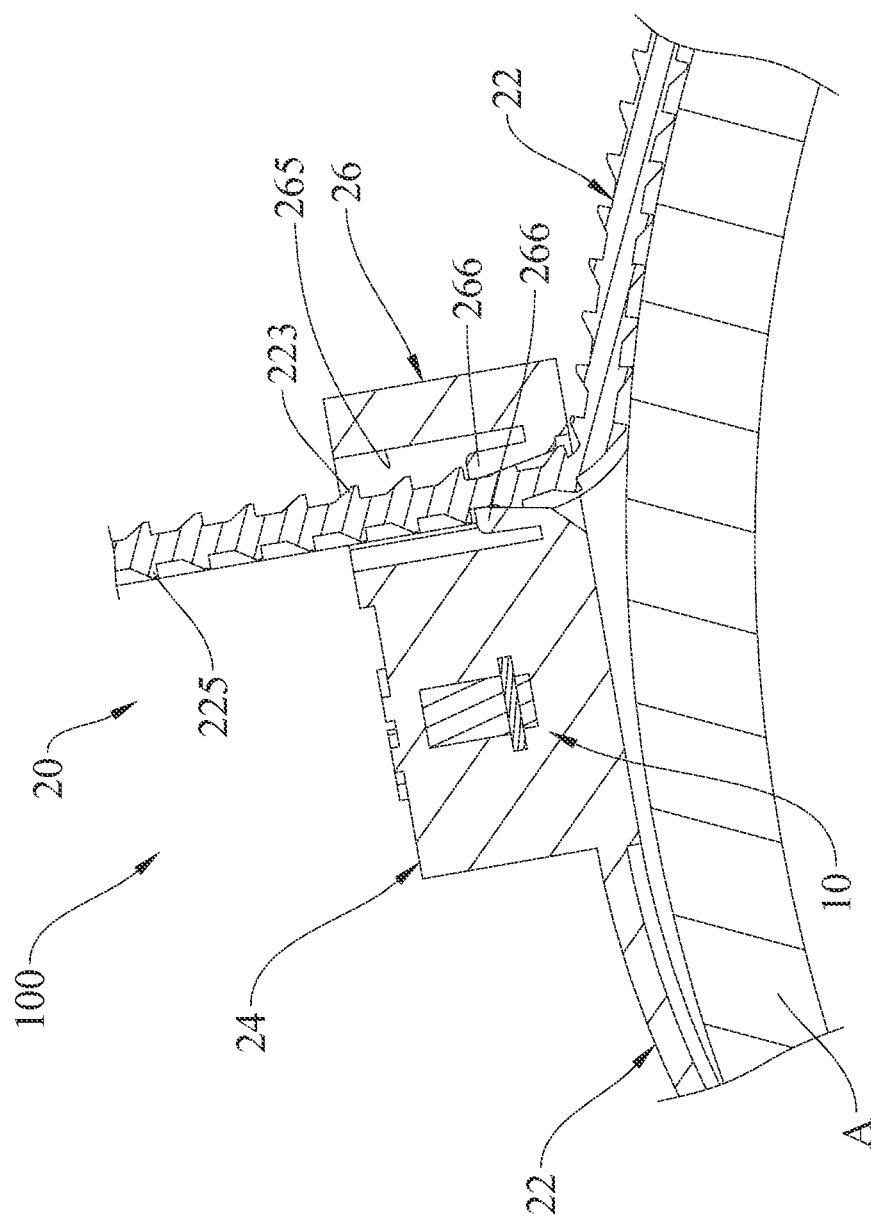
FIG. 8 is a schematic view showing that the tie according to the embodiment of the present invention is wound around the tube.

A second height H2 is provided between the head top face 261 and the head bottom face 262 of the head member 26 in the second direction L2. Referring to FIG. 6, in the current embodiment, a height of the head member 26 in the second direction L2 is comparable to a height of the protection member 24 in the second direction L2; more specifically, the height of the protection member 24 (i.e., the protection height H4), is slightly lower than the height of the head member 26 (i.e., the second height H2) preferably, a height difference between the protection height H4 and the second height H2 is less than or equal to 1 mm; more preferably, the height difference between the protection height H4 and the second height H2 is 0.5 mm. The second height H2 is greater than or equal to twice or three times the first height H1. The height of the protection member 24 between the protection top face 241 and the protection bottom face 242 in the second direction L2 (i.e., the protection height H4) is also greater than or equal to twice or three times the first height H1. In this way, the protection member 24 and the head member 26 that are connected to each other are unsusceptible to be bent compared to the strap member 22. A through hole 265 penetrates through the head top face 261 and the head bottom face 266 and is configured to be passed through by the strap member 22. The through hole 265 is a rectangular hole, wherein a hole wall of the through hole 265 is provided with at least one one-way pawl 266. In the current embodiment, the at least one one-way pawl 266 includes two one-way pawls 266, wherein the two one-way pawls 266 are respectively provided on two opposite sides of the hole wall of the through hole 265 that are respectively adjacent to and away from the protection member 24.

As shown in FIG. 1 and FIG. 6 to FIG. 8, the aforementioned tie 100 is used as an electronic tag or an electronic seal upon using, wherein the RFID device 10 is for devices to read or write data. When fastening the tie 100, the strap member 22 of the body 20 is wound around an object, which is a tube A as an example in the current embodiment, and enters the through hole 265 from a side of the head member 26 with the head bottom face 262, so that each of the one-way pawls 266 in the through hole 265 meshes with the engaging teeth 223 of the strap top face 221 and the engaging teeth 225 of the strip groove 224 of the strap member 22 located in the through hole 265, thereby fastening the body 20 around the tube A for fixing.

When winding the body 20 around the tube A, the protection member 24 with the RFID device 10 does not protrude outward as the protection member 24 is located at a relatively inner position between the strap member 22 and the head member 26, thereby preventing the RFID device 10 from damage due to impacts of external objects when the body 20 is disposed in harsh environments.

Furthermore, the protection member 24 and the head member 26 that are connected to each other are unsusceptible to be bent compared to the strap member 22, so that the protection member 24 and the head member 26 that are connected to each other are less likely to be bent and protrude outward compared to the strap member 22 but a portion of the strap member 22 adjacent to the through hole 265 is bent significantly. Meanwhile, since the structure of the protection member 24 and the head member 26 in the current embodiment occupies a greater portion of the object in a circumferential direction of the object compared to a structure with only the head member 24, the protection bottom face 242 of the protection member 24 and the head bottom face 262 of the head member 26 are closer to the object, that is closer to a surface of the tube A, thereby reducing the extent to which the protection member 24 and the head member 26 protrude outwards simultaneously. The aforementioned designs have the effect of reducing the extent to which the protection member 24 and the head member 26 protrude outwards simultaneously, such that the antenna 14 in the protection member 24 facing the protection top face 241 retains an approximately upward position to be easily sensed by devices.

In other embodiments, the strap member 22 could only be provided with either the plurality of engaging teeth 223 of the strap top face 221 or the plurality of engaging teeth 225 of the strip groove 224, and a side of the hole wall of the through hole 265 corresponding to either the engaging teeth 223 of the strap top face 221 or the engaging teeth 225 of the strip groove 224 is provided with the one-way pawls 266 that matches with either the engaging teeth 223 of the strap top face 221 or the engaging teeth 225 of the strip groove 224; besides, the RFID device 10 could only include one connecting board 122 adapted to support the main board 121 and connected to a side of the main board 121, so that only one connecting board 122 needs to be cut off after encapsulating the RFID device 10 with the body 20 by overmolding, thus only one cutting face 123 exposed outside is provided on the protection peripheral face 243 of the protection member 24.

In addition, in the current embodiment, the protection member 24 is a cylinder and the head member 26 is a rectangular prism, and the two grooves 264 are formed respectively on the two opposite sides of the junction between the protection member 24 and the head member 26. In other embodiments, the junction between the protection member 24 and the head member 26 could be provided without obvious grooves and the protection member 24 and the head member 26 could jointly form a monolithic block; the block could be functionally divided into two parts, wherein one of the two parts of the block encapsulating the RFID device 10 is the protection member 24 while the other part of the block having the through hole 265 provided with the one-way pawls 266 is the head member 26.

It must be pointed out that the embodiments described above are only some embodiments of the present invention. All equivalent structures which employ the concepts disclosed in this specification and the appended claims should fall within the scope of the present invention.

What is claimed is:

1. A tie, comprising an RFID device and a body encapsulating the RFID device by overmolding, wherein:
the RFID device comprises a circuit board and an antenna electrically connected to the circuit board;
the body comprises a strap member, a protection member, and a head member which are integrally formed as a monolithic unit and are connected in sequence; the strap member extends in a first direction and has a strap top face and a strap bottom face, wherein the strap top face has a plurality of engaging teeth arranged along the first direction; the protection member has a protection top face and a protection bottom face, wherein the RFID device is embedded in the protection member; an end of the strap member is connected to a position of the protection member adjacent to the protection bottom face; the head member is connected to a side of the protection member facing away from the strap member and has a head top face and a head bottom face; a through hole penetrates through the head top face and the head bottom face and is configured to be passed through by the strap member, wherein a hole wall of the through hole is provided with at least one one-way pawl;
wherein the strap bottom face is aligned with the protection bottom face and the head bottom face; the protection top face and the head top face respectively protrude relative to the strap top face;
wherein a first height is provided between the strap top face and the strap bottom face in a second direction perpendicular to the first direction; a height of the head member in the second direction is greater than or equal to twice the first height; a height of the protection member in the second direction is greater than or equal to twice the first height.

2. The tie as claimed in claim 1, wherein the strap bottom face has a strip groove extending in the first direction; a plurality of engaging teeth is provided in the strip groove and is arranged along the first direction; the at least one one-way pawl comprises two one-way pawls, wherein the two one-way pawls are respectively provided on two sides of the hole wall of the through hole that are respectively adjacent to and away from the protection member.

3. The tie as claimed in claim 1, wherein the protection member is a cylinder and has a protection peripheral face connected between the protection top face and the protection bottom face; the head member is a rectangular prism and has a head peripheral face connected between the head top face and the head bottom face; a side of the head peripheral face is connected to a corresponding side of the protection peripheral face, wherein two grooves are formed respectively on two opposite sides of a junction between the protection member and the head member.

4. The tie as claimed in claim 3, wherein the circuit board comprises a main board and two connecting boards respectively connected to two opposite sides of the main board; a cutting face is formed on an end of each of the two connecting boards away from the main board; the two cutting faces of the two connecting boards are respectively aligned with two opposite sides of the protection peripheral face and are exposed outside; the antenna is electrically connected to the main board of the circuit board.

5. A tie, comprising an RFID device and a body encapsulating the RFID device by overmolding, wherein:

the RFID device comprises a circuit board and an antenna electrically connected to the circuit board;

the body comprises a strap member, a protection member, and a head member which are integrally formed as a monolithic unit and are connected in sequence; the strap member extends in a first direction and has a strap top face and a strap bottom face, wherein the strap top face has a plurality of engaging teeth arranged along the first direction; the protection member has a protection top face and a protection bottom face, wherein the RFID device is embedded in the protection member; an end of the strap member is connected to a position of the protection member adjacent to the protection bottom face; the head member is connected to a side of the protection member facing away from the strap member and has a head top face and a head bottom face; a through hole penetrates through the head top face and the head bottom face and is configured to be passed through by the strap member, wherein a hole wall of the through hole is provided with at least one one-way pawl;

wherein the circuit board comprises a main board and at least one connecting board connected to the main board; a cutting face is formed on an end of the at least one connecting board away from the main board, is aligned with a protection peripheral face of the protection member, and is exposed outside; the antenna is electrically connected to the main board of the circuit board.

6. A tie, comprising an RFID device and a body encapsulating the RFID device by overmolding, wherein:

the RFID device comprises a circuit board and an antenna electrically connected to the circuit board;

the body comprises a strap member, a protection member, and a head member which are integrally formed as a monolithic unit and are connected in sequence; the strap member extends in a first direction and has a strap top face and a strap bottom face, wherein the strap top face has a plurality of engaging teeth arranged along the first direction; the protection member has a protection top face and a protection bottom face, wherein the RFID device is embedded in the protection member; an end of the strap member is connected to a position of the protection member adjacent to the protection bottom face; the head member is connected to a side of the protection member facing away from the strap member and has a head top face and a head bottom face; a through hole penetrates through the head top face and the head bottom face and is configured to be passed through by the strap member, wherein a hole wall of the through hole is provided with at least one one-way pawl;

wherein the protection bottom face has a recess recessing inward;

wherein a depth of the recess gradually decreases from a center of the recess to a periphery around the center of the recess.

7. A tie, comprising an RFID device and a body encapsulating the RFID device by overmolding, wherein:

the RFID device comprises a circuit board and an antenna electrically connected to the circuit board;

the body comprises a strap member, a protection member, and a head member which are integrally formed as a monolithic unit and are connected in sequence; the strap member extends in a first direction and has a strap top face and a strap bottom face, wherein the strap top face has a plurality of engaging teeth arranged along the first direction; the protection member has a protection top face and a protection bottom face, wherein the RFID device is embedded in the protection member; an end of the strap member is connected to a position of the protection member adjacent to the protection bottom face; the head member is connected to a side of the protection member facing away from the strap member and has a head top face and a head bottom face; a through hole penetrates through the head top face and the head bottom face and is configured to be passed through by the strap member, wherein a hole wall of the through hole is provided with at least one one-way pawl;

wherein the main board of the circuit board has a main bottom face; a deposing height is provided between the main bottom face and the protection bottom face in a second direction perpendicular to the first direction; a height of the strap member is provided between the strap top face and the strap bottom face in the second direction; a height of the protection member is provided between the protection top face and the protection bottom face in the second direction; the deposing height is greater than the first height and is less than or equal to 60% of the protection height.

\* \* \* \* \*